(12) United States Patent
Nonaka

(10) Patent No.: US 8,320,609 B2
(45) Date of Patent: Nov. 27, 2012

(54) DEVICE AND METHOD FOR ATTACHING ADDITIONAL INFORMATION

(75) Inventor: Shunichiro Nonaka, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 576 days.

(21) Appl. No.: 12/568,526

(22) Filed: Sep. 28, 2009

(65) Prior Publication Data

US 2010/0080414 A1 Apr. 1, 2010

(30) Foreign Application Priority Data

Sep. 29, 2008 (JP) ................................ 2008-249451

(51) Int. Cl.
*G06K 9/00* (2006.01)
(52) U.S. Cl. ...................................... 382/100; 713/176
(58) Field of Classification Search .................. 382/100, 382/181, 190, 195, 206, 224–229; 713/176; 707/705–779
See application file for complete search history.

(56) References Cited

U.S. PATENT DOCUMENTS

| | | | | |
|---|---|---|---|---|
| 6,819,797 | B1 * | 11/2004 | Smith et al. ................... | 382/181 |
| 8,078,603 | B1 * | 12/2011 | Chandratillake et al. ..... | 707/706 |
| 8,086,612 | B2 * | 12/2011 | Matsushita et al. ........... | 707/752 |
| 8,145,648 | B2 * | 3/2012 | Kunjithapatham et al. ... | 707/749 |
| 2005/0105776 | A1 * | 5/2005 | Luo et al. ...................... | 382/115 |
| 2011/0043437 | A1 * | 2/2011 | Tang et al. ...................... | 345/55 |
| 2011/0314049 | A1 * | 12/2011 | Poirier et al. .................. | 707/769 |
| 2011/0317885 | A1 * | 12/2011 | Leung et al. ................... | 382/118 |

FOREIGN PATENT DOCUMENTS

| | | |
|---|---|---|
| JP | 10-91634 A | 4/1998 |
| JP | 2006-86823 A | 3/2006 |
| JP | 2007-515703 A | 6/2007 |
| JP | 2008-165700 A | 7/2008 |

* cited by examiner

*Primary Examiner* — Anand Bhatnagar
(74) *Attorney, Agent, or Firm* — Birch, Stewart, Kolasch & Birch, LLP

(57) ABSTRACT

An image analyzing section acquires information on a type of a subject as an image attribute using an image analysis technique, and if the subject is a human, information on clothes of the human as the image attribute. In an additional information DB, there are provided plural pieces of candidate additional information which possibly become additional information, plural reference attributes for each piece of the candidate additional information, and individual compatibility degrees for the respective reference attributes. For every piece of the candidate additional information, a sum of the individual compatibility degrees of the reference attributes which are correlated with the image attributes acquired from the image are calculated as a total compatibility degree. The candidate additional information having the total compatibility degree equal to or higher than a certain value is selected as additional information. A tag having this additional information is attached to an image file.

5 Claims, 5 Drawing Sheets

FIG. 3

| CANDIDATE ADDITIONAL INFORMATION | REFERENCE ATTRIBUTE | COMPATIBILITY | SCORE | WEIGHT |
|---|---|---|---|---|
| ATHLETIC MEET | TAKEN AT SCHOOL OR KINDERGARTEN | A01(=W01·X01) | X01 | W01 |
| | OUTDOOR (ILLUMINANCE LEVEL IS THRESHOLD VALUE OR HIGHER) | A02(=W02·X02) | X02 | W02 |
| | SUBJECT IS CHILD (HUMAN) | A03(=W03·X03) | X03 | W03 |
| | SUBJECT IS WEARING GYM WEAR | A04(=W04·X04) | X04 | W04 |
| | TAKEN IN SPRING OR AUTUMN | A05(=W05·X05) | X05 | W05 |
| | ... | ... | ... | ... |
| THE SEVEN-FIVE-THREE FESTIVAL | TAKEN AT SHRINE | A11(=W11·X11) | X11 | W11 |
| | SUBJECT IS CHILD (HUMAN) | A12(=W12·X12) | X12 | W12 |
| | SUBJECT IS WEARING KIMONO | A13(=W13·X13) | X13 | W13 |
| | TAKEN AROUND NOVEMBER | A14(=W14·X14) | X14 | W14 |
| | ... | ... | ... | ... |
| SEA BATHING | TAKEN ON THE BEACH | A21(=W21·X21) | X21 | W21 |
| | OUTDOOR (ILLUMINANCE LEVEL IS THRESHOLD VALUE OR HIGHER) | A22(=W22·X22) | X22 | W22 |
| | SEA IN BACKGROUND | A23(=W23·X23) | X23 | W23 |
| | SUBJECT IS WEARING SWIMSUIT | A24(=W24·X24) | X24 | W24 |
| | TAKEN IN SUMMER | A25(=W25·X25) | X25 | W25 |
| | ... | ... | ... | ... |
| ENTRANCE CEREMONY | TAKEN AT SCHOOL OR KINDERGARTEN | A31(=W31·X31) | X31 | W31 |
| | INDOOR (ILLUMINANCE LEVEL IS LOWER THAN THRESHOLD VALUE) | A32(=W32·X32) | X32 | W32 |
| | SUBJECT IS WEARING UNIFORM | A33(=W33·X33) | X33 | W33 |
| | TAKEN AROUND APRIL | A34(=W34·X34) | X34 | W34 |
| | TAKEN IN THE DAYTIME | A35(=W35·X35) | X35 | W35 |
| | | | ... | ... |
| ... | | | | |

DEVICE AND METHOD FOR ATTACHING ADDITIONAL INFORMATION

FIELD OF THE INVENTION

The present invention relates to a device and a method for attaching additional information which is used for image retrieval to images.

BACKGROUND OF THE INVENTION

A variety of images such as still images and movies shown on the internet has recently been available owing to the popularization of digital cameras, digital video cameras and the internet. Along with this trend, the demand for easy retrieval of desired images from among such a large amount of images is increasing.

There is known a retrieval system in which images are firstly narrowed down according to tags attached thereto and then only the selected images are analyzed so that the volume of calculation for the image retrieval is reduced (Japanese Patent Laid-open Publication No. 10-091634). The tags are, for example, photography conditions (date/time, location, etc.). It is also known a digital camera which attaches tags to taken images when recording them in media to enhance image retrieval performance. The tags include information on a photographer and environmental conditions at the time of photography (temperature, humidity, illuminance level, etc.) (Japanese Patent Laid-open Publication No. 2006-086823). Moreover, there is known a method for classifying images according to colors and textures of the image as well as information obtained from tags, such as exposure time, f-number, shutter speed, luminance, subject distance, whether a flash was used, etc. (Japanese Patent Laid-open Publication No. 2007-515703).

Even with the above-described techniques, however, the images are not classified or retrieved based on their essential elements, that is, the most notable contents in the image retrieval. The essential elements of the images are, for example, in which event or scene the image was taken or what the main subject of the image is.

SUMMARY OF THE INVENTION

In view of the foregoing, it is an object of the present invention to provide a device and a method for attaching additional information which enable image retrieval based on essential elements of images like in which event or scene the image was taken or what the main subject is.

In order to achieve the above and other objects, an additional information attaching device of the present invention includes an image input section, an attribution acquisition section, a candidate additional information storage section, a compatibility evaluation section, an additional information selecting section, and an attaching section. The image input section inputs an image. The attribution acquisition section acquires attribution elements of the input image as image attribution elements. The candidate additional information storage section stores pieces of candidate additional information, reference attribution elements, which are preliminarily prepared for each piece of the candidate additional information, representing attribution relevant to the contents of the candidate additional information, and first compatibility degrees of the reference attribution elements. The compatibility evaluation section evaluates second compatibility degree between the input image and the candidate additional information based on the first compatibility degrees of the reference attribution elements correlated with the image attribution elements acquired from the input image. The additional information selecting section selects additional information from among the pieces of candidate additional information based on the second compatibility degree evaluated in the compatibility evaluation section. The attaching section attaches a tag having the additional information selected in the additional information selecting section to the input image.

It is preferable that the compatibility evaluation section sets a sum of the first compatibility degrees of the reference attribution elements correlated with the image attribution elements acquired in the attribution acquisition section as the second compatibility degree. At this time, the additional information selecting section selects candidate additional information having the second compatibility degree equal to or higher than a predetermined threshold value as the additional information.

It is preferable that the reference attribution elements include at least one of a photography location, period of time of photography, point of time of photography, illuminance level, attribution of a human as a subject, clothes of the human, photography parameter, environmental condition at the time of photography, and parameter of a photographer.

It is preferable that the first compatibility degree is determined based on a statistical probability that an image having the contents of the candidate additional information to which the reference attribution elements are related exists, and on a statistical probability that the image having the contents of the candidate additional information has the reference attribution element.

It is preferable that combinations of preliminarily prepared plural images and reference attribution elements respectively corresponding thereto are machine-learned, and the first compatibility degree of the reference attribution element is based on a probability obtained for each reference attribution element.

An additional information attaching method of the present invention includes the following steps: an attribution acquisition step, a referring step, a compatibility evaluation step, an additional information selecting step, and an attaching step. In the attribution acquisition step, attribution elements of an input image are acquired as image attribution elements. In the referring step, a table representing pieces of candidate additional information, reference attribution elements, which are preliminarily prepared for each piece of the candidate additional information, representing attribution relevant to the contents of the candidate additional information, and first compatibility degrees of the reference attribution elements is referred. In the compatibility evaluation step, a second compatibility degree between the input image and the candidate additional information is evaluated based on the first compatibility degrees of the reference attribution elements correlated with the image attribution elements acquired from the input image. In the additional information selecting step, additional information is selected from among the pieces of candidate additional information based on the evaluated second compatibility degree. In the attaching step, a tag having the selected additional information is attached to the input image.

According to the present invention, additional information representing essential elements of images can be added thereto as tags with ease, and thereby realizing image classification and image retrieval based on the essential elements.

BRIEF DESCRIPTION OF THE DRAWINGS

The above objects and advantages of the present invention will become more apparent from the following detailed description when read in connection with the accompanying drawings, in which:

FIG. 3 is an explanatory view illustrating an example of a list of compatibility evaluation;

DETAILED DESCRIPTION OF THE PREFERRED EMBODIMENTS

Figure 1:
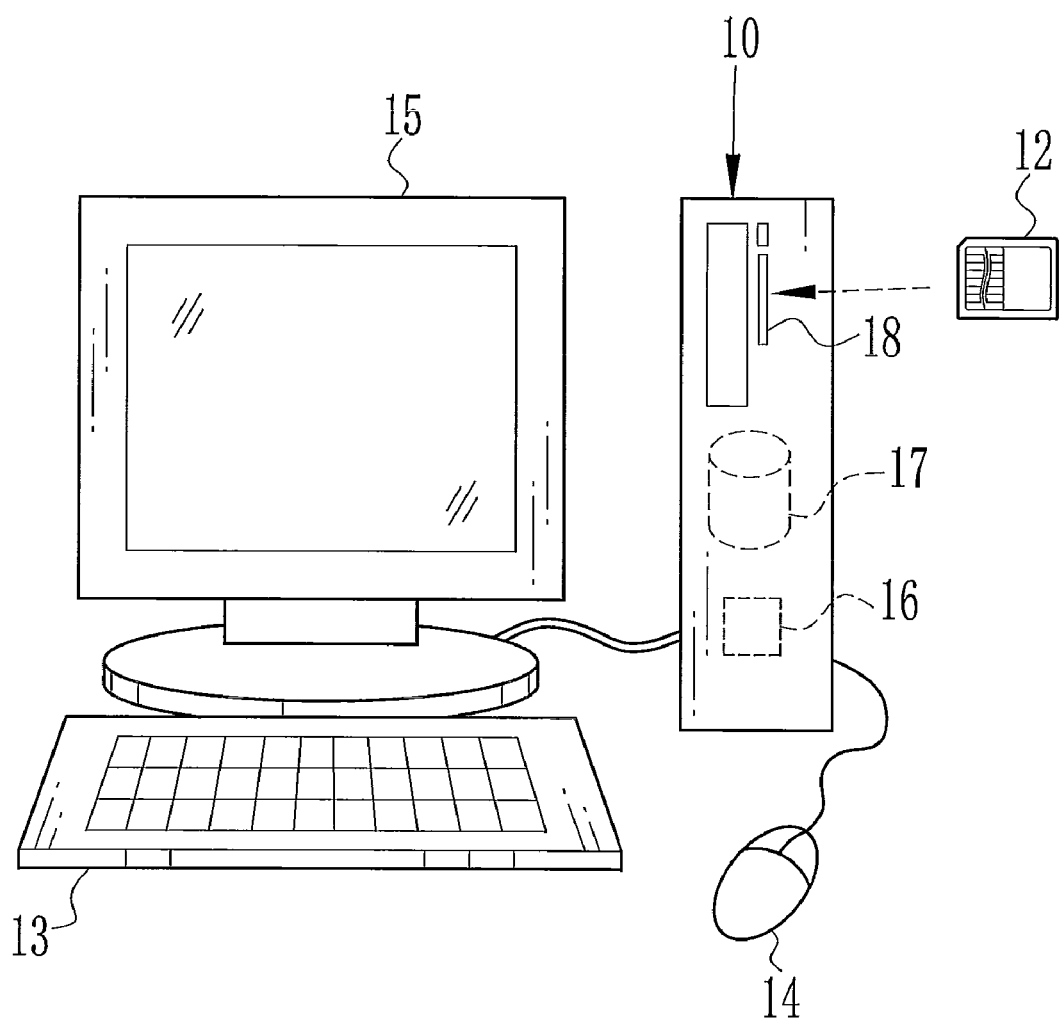
FIG. 1 is a schematic perspective view illustrating a personal computer (PC) as an additional information attaching device to which the present invention is applied.
Figure 2:
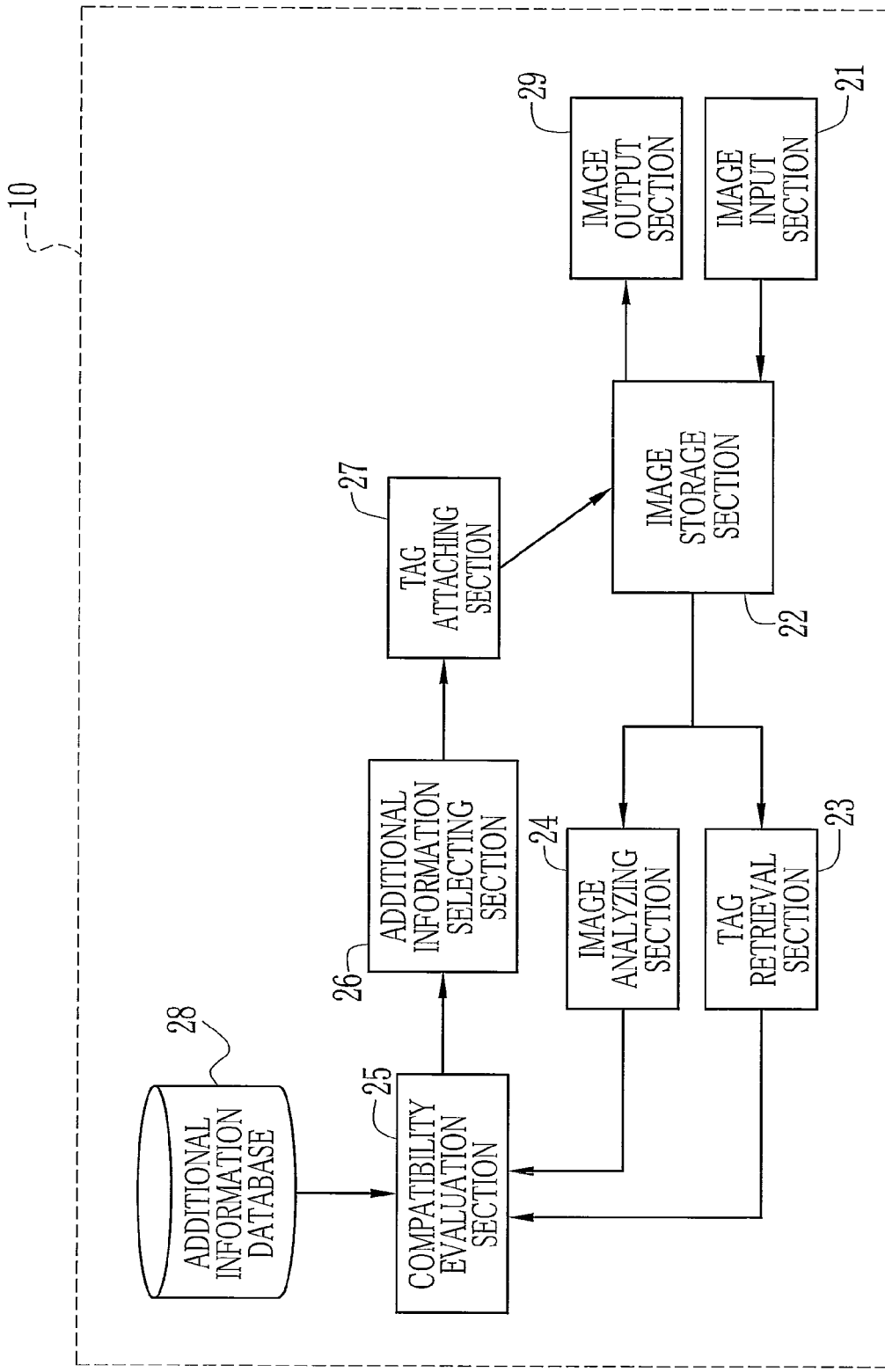
FIG. 2 is a block diagram illustrating a configuration of the PC.

In an embodiment shown in FIG. 1, a personal computer (PC) 10 is used as the claimed additional information attaching device, and attaches tags having a variety of additional information to images in a memory card 12.

As well known, a keyboard 13, a mouse 14, and a monitor 15 are connected to the PC 10. The PC 10 is provided with a CPU 16 for executing various processing, a hard disk 17 for storing various programs and data, and a card drive 18 to which the memory card 12 is inserted. An additional information attaching program is written in the hard disk 17.

Images taken with a digital camera, for example, are recorded in the form of image file in the memory card 12. Besides the images, the image file includes tags having a variety of additional information. When the memory card 12 is inserted to the card drive 18, the image files are read out from the memory card 12, and the image files to which produced tags are attached are recorded in the memory card 12.

When the CPU 16 executes the additional information attaching program, the PC 10 functions as an image input section 21, an image storage section 22, a tag retrieval section 23, an image analyzing section 24, a compatibility evaluation section 25, an additional information selecting section 26 or information retriever, a tag attaching section 27 or information editor, an additional information database (DB) 28, and an image output section 29.

The image input section 21 acquires images to which tags are to be attached. The image input section 21 is provided with the card drive 18 and reads out the image files recorded in the memory card 12. In this embodiment, more than one image file are read out at once. However, it is also possible that the image file is read out and processed one by one. The image storage section 22 is composed of a memory (not shown) or the hard disk 17 and stores the image files read out by the image input section 21.

The claimed attribution acquisition section or attribute generator is composed of the tag retrieval section 23 and the image analyzing section 24, and acquires an attribution element unique to each image as an image attribution element. The tag retrieval section 23 reads out the contents of existing tags from the image file recorded in the image storage section 22. The tag retrieval section 23 then acquires additional information such as location and date/time of the taken image as the image attribution elements. In addition, the tag retrieval section 23 acquires luminance as the image attribution element from photography parameters. The photography parameters also include f-number, shutter speed, ISO sensitivity, focal length, zoom magnification, illuminance level, depth of field, whether a flash was used, etc. as the contents of the tags.

The location which is recorded in the tag indicates information on latitude and longitude detected by a positioning sensor for global positioning system (GPS) provided in the digital camera. The latitude and longitude information can directly be used, however the image analyzing section 24 in this embodiment converts the location indicated by the latitude and longitude into information of facilities like "school" and "kindergarten", or places like "beach" using, for example, a map information, and stores the converted information as the image attribution element. To convert the latitude and longitude information into the facility or place information, data for the conversion may be provided in the PC 10 or the PC 10 may be connected to an external server for the conversion.

The image analyzing section 24 applies a variety of image processing to the image, and thereby acquiring the image attribution elements from the image itself. The image attribution elements may be sex of a human, clothes of the human, whether the human is an adult or a child, whether the image was taken indoor or outdoor, and the like based on the human extracted in the face recognition technology. Note that the image attribution elements may be acquired by applying the image processing after the consideration of the contents of the tags.

The image attribution elements acquired in the tag retrieval section 23 and the image analyzing section 24 are input to the compatibility evaluation section 25. The compatibility evaluation section 25 calculates the degree of total compatibility (second compatibility) as relevant level for each piece of candidate additional information, which is preliminarily prepared, using the input image attribution elements and a compatibility evaluation list preliminarily registered in the additional information DB 28.

Based on the total compatibility degree calculated in the compatibility evaluation section 25, the additional information selecting section 26 selects additional information which is to be attached to the image from among plural pieces of the candidate additional information. In this selection, the additional information selecting section 26 selects additional information having, for example, the total compatibility degree equal to or higher than a predetermined threshold value. Owing to this, additional information appropriate for the subject image can be selected.

To select the additional information, for example, only a piece of candidate additional information with highest total compatibility degree may be selected, or limited pieces of top candidate additional information may be selected. The threshold value for selecting the candidate additional information may be same for all of the candidates, or may be changed for each candidate.

The tag attaching section 27 attaches a tag, having the additional information selected in the additional information selecting section 26 as its contents, to the subject image file recorded in the image storage section 22.

The image output section 29 is composed of the card drive 18 and outputs the processed image file. After the tag is attached to the image file, the image output section 29 records this processed image file in the memory card 12. The processed image file may be recorded in the memory card 12 different from the one used to store the image file before the processing. When the processed image file is recorded in the same memory card 12, the image file may be recorded as a new image file or may be overwritten.

As described above, the compatibility evaluation list is preliminarily registered in the additional information DB 28. As shown in FIG. 3, the compatibility evaluation list includes plural pieces of the candidate additional information which are the candidates of additional information to be attached to the image, plural reference attribution elements preliminarily prepared for each piece of the candidate additional information and each indicating attribution relevant to the contents of the additional information, individual compatibility degree (first compatibility) between the reference attribution element and the relevant additional information. Note that score and weight corresponding to the individual compatibility degree are also show in FIG. 3 for the convenience of explanation.

The candidate additional information may be an event or a scene like "athletic meet", "the seven-five-three festival", "sea bathing", or "entrance ceremony" indicating the contents of the image. Besides the events and scenes, the candidate additional information may also be name, sex, color, shape or the like of the subject in the image, or any other information useful for classifying/retrieving the image.

The reference attribution elements are for presuming the type of the event or the scene of the relevant candidate additional information. The individual compatibility degree indicates the degree of relevancy between the reference attribution element and the relevant candidate additional information. When the individual compatibility degree of the reference attribution element is high, the probability that this reference attribution coincides with the image of the event or the scene shown in the relevant candidate information is high.

The compatibility evaluation section 25 calculates the total compatibility degree between the input image and the candidate additional information based on the individual compatibility degree relevant to each reference attribution element correlated with the image attribution element acquired in the tag retrieval section 23 and the image analyzing section 24. Specifically, the compatibility evaluation section 25 calculates a sum of the individual compatibility degrees of the reference attribution elements, which are correlated with the image attribution elements, for each piece of the candidate additional information. The correlativity between the image attribution element and the reference attribution element may be expressed as, for example, the case in which the reference attribution element coincides with the image attribution element, or the case in which the image attribution element satisfies conditions of the reference attribution element.

In this embodiment, the individual compatibility degree is obtained as the product of the "score" and the "weight" set to correspond with each reference attribution element. The "score" is a value of "1−X" when the statistical probability that the contents of the reference attribution element appears in the taken image is "X·100"% regardless of the event or scene shown in the additional information. The "weight" is a value of "W" when the statistical probability that the taken image coincides with the contents of the reference attribution element with the event or the scene shown in the additional information is "W·100"%. The "weight" is a function that depends on "whether the contents of the reference attribution element coincide with the event or the scene shown in the additional information".

The individual compatibility degree may be of any value as long as it indicates the degree of probability that the reference attribution element indicates the event or the scene shown in the set candidate additional information. For example, only the above-described value "W" may be used. If the weight of the reference attribution element relevant to the candidate additional information needs to be increased, the value "W" can be set greater.

In order to determine the individual compatibility degree corresponding to the reference attribution element, it is also possible that the combinations of preliminarily prepared numerous images and candidate additional information corresponding to each of the prepared images and the image attribution elements (reference attribution elements) are firstly machine-learned, and the probability that the reference attribution element corresponds to each image attribution element is obtained.

Figure 4A:
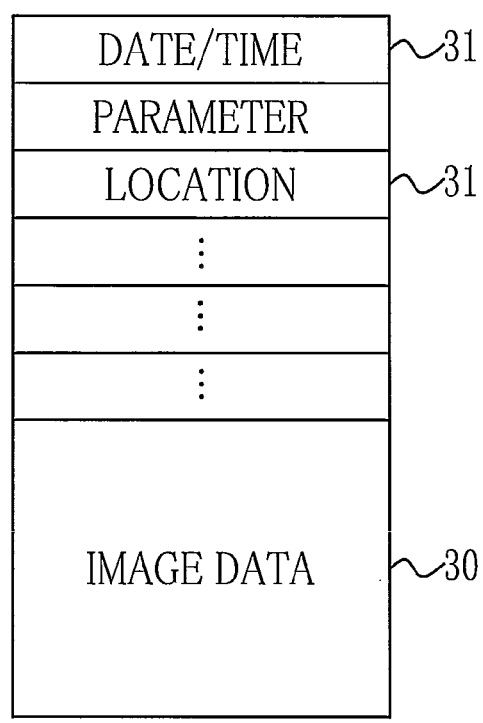
FIG. 4 is an explanatory view illustrating a configuration of an image file having tags.
Figure 4B:
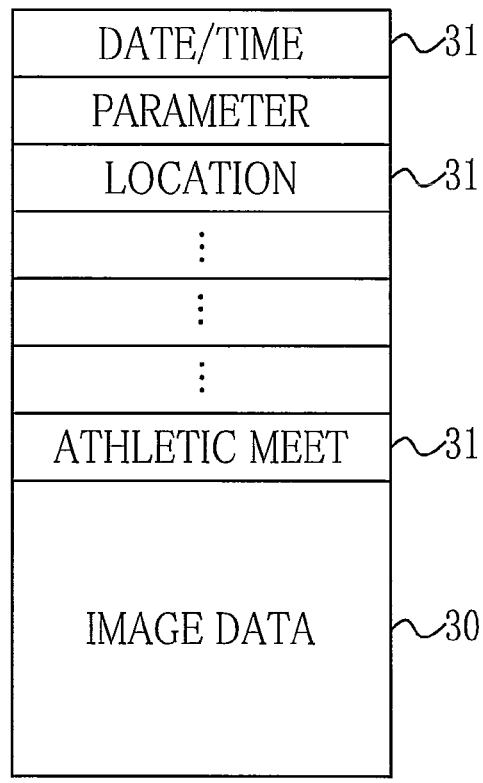

In FIGS. 4A and 4B, the tags recorded in the image file are illustrated. The format of the image file is, for example, an EXIF format (Exchangeable Image File) and tags 31 indicating date/time and the like are attached to image data 30. The contents of the tags 31 are, for example, the location of the photography measured by using the GPS of the digital camera, date/time, and photography parameters. The PC 10 attaches additional information to the image file shown in FIG. 4A. Then, a tag 31 having the contents of "athletic meet" is added to the image file as shown in FIG. 4B.

Figure 5:
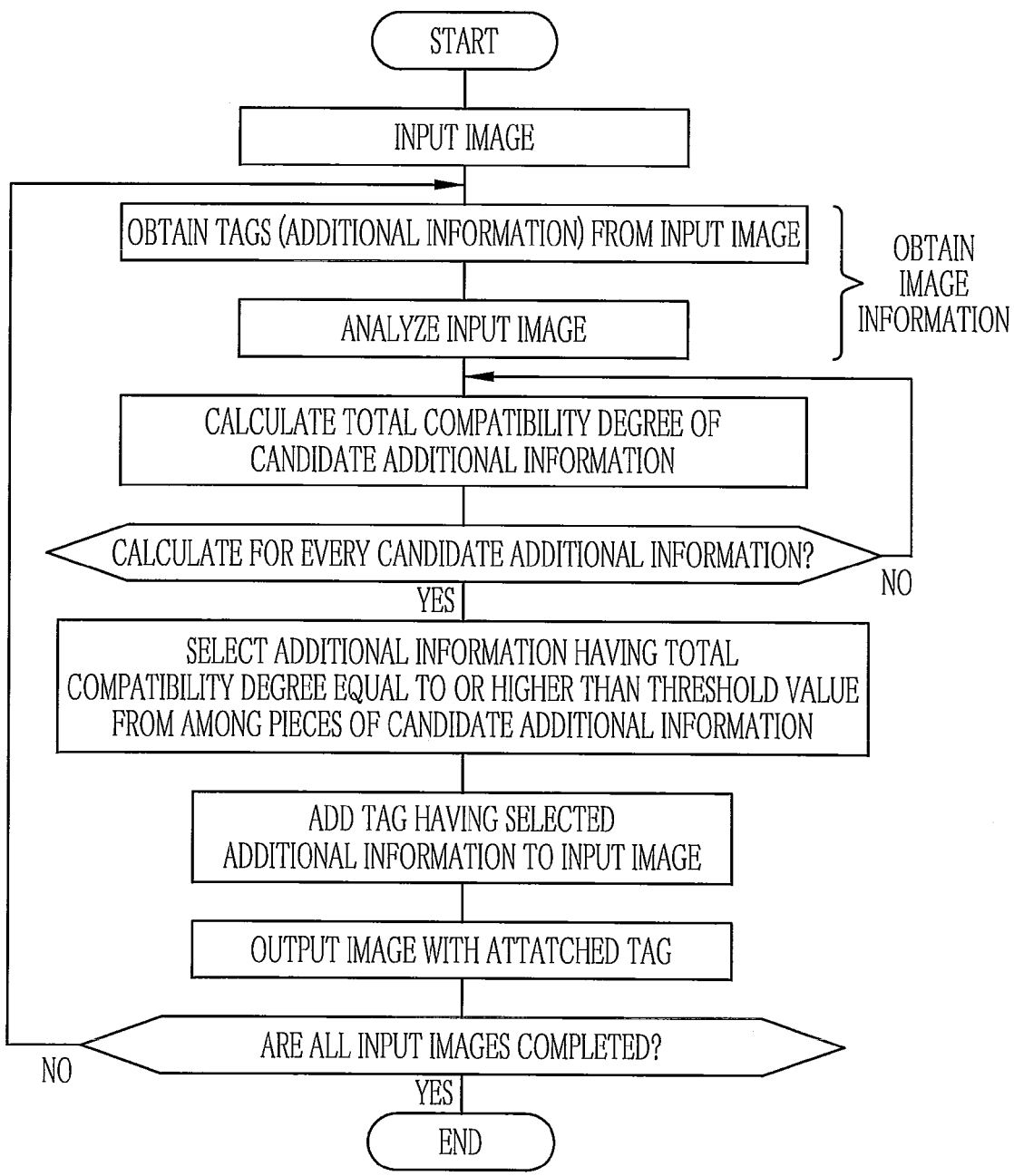
FIG. 5 is a flow chart illustrating procedures for adding additional information to images.

An operation of the above configuration will be explained with reference to the flow chart of FIG. 5. When the additional information is attached to the image, memory card 12 is inserted to the card drive 18.

Each image file readout from the memory card 12 by the card drive 18, is written in the image storage section 22. Then, the tag retrieval section 23 reads out the tags from the first image file. When the photography date/time is written as the contents of the tag, the photography date/time is obtained as the image attribution element and sent to the compatibility evaluation section 25. When the photography location (latitude and longitude) is written as the contents of the tag, the position indicated with the latitude and longitude is converted into the information of the facility or the place like "school", "kindergarten" or "beach", and the converted information is sent to the compatibility evaluation section 25 as the image attribution element. Moreover, when the photography parameters are written as the contents of the tag, the illuminance level is sent to the compatibility evaluation section 25 as the image attribution element.

Meanwhile, the image analyzing section 24 reads out the image from the image file recorded in the image storage section 22 and analyzes it, and thereby obtaining a variety of information such as, type of the subject, and if the subject is a human, clothes of the human, whether the human is an adult or a child, and the like. The information obtained as such is sent to the compatibility evaluation section 25 as the image attribution elements.

Whether the image attribution elements coincide with the reference attribution elements of the compatibility evaluation list are sequentially examined for every piece of the candidate additional information. If there is reference attribution element correlated with the acquired image attribution element, the individual compatibility degree relevant to this reference attribution element is retrieved. A sum of the individual compatibility degrees for each piece of the candidate additional information is calculated, and thereby the total compatibility degree for each piece of the candidate additional information is calculated.

For example, the location is "school", the subject is "child (human)", the subject is wearing "uniform", the illuminance level is "lower than threshold value" and the date/time is "Apr. 7, 2008 at 10:23 am" based on the image attribution elements acquired from the image. As to the candidate additional information "athletic meet", for example, the reference attribution elements "taken at school or kindergarten", "subject is child (human)" and "taken in spring or autumn" are correlated to the image attribution elements, and therefore the compatibility degrees "A01", "A03" and "A05", respectively are added up and the sum thereof is obtained as the total compatibility degree.

As to the candidate additional information "entrance ceremony", for example, all of the reference attribution elements "taken at school or kindergarten", "indoor (illuminance level is lower than threshold value)", "subject is wearing uniform", "taken around April" and "taken in the daytime" are correlated to the image attribution elements, and therefore the compatibility degrees "A31" to "A35", respectively are added up and the sum thereof is obtained as the total compatibility degree. As to the candidate additional information "sea bathing", no reference attribution elements are correlated to the image attribution elements, and therefore the total compatibility degree becomes "0".

When the total compatibility degree for each piece of the candidate additional information is calculated, the candidate additional information and the corresponding total compatibility degree are sequentially sent to the additional information selecting section 26. When the total compatibility degree is higher than the threshold value, the corresponding candidate additional information is judged to be appropriate and sent to the tag attaching section 27. The tag attaching section 27 adds a tag having the contents of the selected additional information to the first subjected image file. In this embodiment, tags of "athletic meet" and "entrance ceremony" as the additional information are sequentially added.

When the tags are added to the first image file, the image file is recorded in the memory card 12 by the card drive 18. After the first image file is output, the above described processing is performed to the second and the rest of the image files sequentially, and tags having the contents of the additional information whose total compatibility degrees are higher than the threshold value are added. Owing to this, the additional information of the event, scene and the like which correspond to the contents of the image can automatically be attached to the image.

As described above, the additional information having the contents corresponding to the contents of the image can be added to the image file as the tags. With use of these tags, the images can be classified or retrieved based on the essential elements of the images like in which event or scene the image was taken.

The reference attribution elements in the above embodiment are examples. The reference attribution elements may be photography location, period of time of photography, point of time of photography, illuminance level (outdoor/indoor), attributions of a human as the subject (age, sex, personal identification information, direction of face, whether eyes are open/closed, etc.), clothes of the subject, photography parameters (shutter speed, f-number, ISO sensitivity, exposure time, zoom magnification, depth of field, whether a flash was used, etc.), environmental conditions at the time of photography (temperature, humidity, etc.), and parameters of a photographer. The reference attribution elements are preferably at least one of these. Note that the image attribution elements corresponding to the set reference attribution elements are to be acquired from the image or the image file.

In the above embodiment, the latitude and longitude information detected by the positioning sensor for GPS is used. It is also possible to record positioning accuracy as the contents of the tag according to, for example, the intensity of the signal received form GPS satellites or the number of the GPS satellites from which signals can be received, and obtain the individual compatibility degree of the photography location in consideration of the positioning accuracy. Specifically, the probability P of the location being a specific facility or place (school, kindergarten, etc.) is presumed based on the positioning accuracy, and the individual compatibility degree may be obtained as a value of "$W \cdot P \cdot (1-X) - W \cdot (1-P) \cdot X$".

In the above embodiment, the image attribution elements acquired from the subject image are only used. However, if a plurality of image files is processed at once, the attribution elements of other images or image files can also be referred. In this case, it is possible that the individual compatibility degree is added when the images taken before and after the subjected image have similar attribution elements (characteristics) to the subjected image.

In the above embodiment, the PC is used as the additional information attaching device. It is possible that the image files are transferred from the PC or the digital camera having communication function to a server as the additional information attaching device via a communication circuit (for example, internet), and attaches tags of additional information in this server. It is also possible that the additional information is acquired from an additional information DB externally provided, and the acquired additional information is added to the image file in the PC. It is of course possible that the photography device like the digital camera is provided with the additional information attaching function, or an additional information processing device, or an image filing device.

Although the present invention has been fully described by the way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. An additional information attaching device comprising:
an image input section for inputting an image;
an attribution acquisition section for acquiring attribution elements of said input image as image attribution elements;
a candidate additional information storage section for storing pieces of candidate additional information, reference attribution elements, which are preliminarily prepared for each piece of said candidate additional information, representing attribution relevant to the contents of said candidate additional information, and first compatibility degrees of said reference attribution elements;
a compatibility evaluation section for evaluating second compatibility degree between said input image and said candidate additional information based on said first compatibility degrees of said reference attribution elements correlated with said image attribution elements acquired from said input image;
an additional information selecting section for selecting additional information from among said pieces of candidate additional information based on said second compatibility degree evaluated in said compatibility evaluation section; and
an attaching section for attaching a tag having said additional information selected in said additional information selecting section to said input image.

2. The additional information attaching device of claim 1, wherein said compatibility evaluation section sets a sum of said first compatibility degrees of said reference attribution elements correlated with said image attribution elements acquired in said attribution acquisition section as said second compatibility degree, and wherein
said additional information selecting section selects candidate additional information having said second compatibility degree equal to or higher than a predetermined threshold value as said additional information.

3. The additional information attaching device of claim 2, wherein said reference attribution elements include at least one of a photography location, period of time of photography, point of time of photography, illuminance level, attribution of a human as a subject, clothes of said human, photography parameter, environmental condition at the time of photography, and parameter of a photographer.

4. The additional information attaching device of claim 3, wherein said first compatibility degree is determined based on a statistical probability that an image having the contents of said candidate additional information to which said reference attribution elements are related exists, and on a statistical probability that said image having the contents of said candidate additional information has said reference attribution element.

5. The additional information attaching device of claim 3, wherein combinations of preliminarily prepared plural images and reference attribution elements respectively corresponding thereto are machine-learned, and wherein
said first compatibility degree of said reference attribution element is based on a probability obtained for each reference attribution element.

* * * * *